(12) United States Patent
Friszell

(10) Patent No.: US 10,557,489 B2
(45) Date of Patent: Feb. 11, 2020

(54) RATCHETING PIN ADJUSTABLE FASTENING SYSTEM

(71) Applicant: GM GLOBAL TECHNOLOGY OPERATIONS LLC, Detroit, MI (US)

(72) Inventor: Nicholas V. Friszell, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 342 days.

(21) Appl. No.: 15/655,110

(22) Filed: Jul. 20, 2017

(65) Prior Publication Data

US 2019/0024688 A1 Jan. 24, 2019

(51) Int. Cl.
| F16B 39/10 | (2006.01) |
| F16B 5/02 | (2006.01) |
| F16B 5/06 | (2006.01) |
| F16B 21/08 | (2006.01) |
| F16B 21/06 | (2006.01) |
| F16B 15/02 | (2006.01) |

(52) U.S. Cl.
CPC .......... *F16B 5/0291* (2013.01); *F16B 5/0233* (2013.01); *F16B 5/0628* (2013.01); *F16B 21/088* (2013.01); *F16B 15/02* (2013.01); *F16B 21/06* (2013.01); *F16B 21/065* (2013.01)

(58) Field of Classification Search
CPC .... F16B 5/0233; F16B 5/0628; F16B 5/0283; F16B 5/025
USPC ................................ 411/119, 546; 362/549
See application file for complete search history.

(56) References Cited

U.S. PATENT DOCUMENTS

| 4,276,966 | A | * | 7/1981 | Ayers | ..................... | F16D 65/563 |
| | | | | | | 188/196 BA |
| 5,106,225 | A | | 4/1992 | Andre et al. | | |
| 5,839,321 | A | * | 11/1998 | Siemons | ............. | F16H 25/2006 |
| | | | | | | 74/441 |
| 6,041,671 | A | * | 3/2000 | Erikson | ............... | F16H 25/2006 |
| | | | | | | 411/231 |
| 6,264,393 | B1 | * | 7/2001 | Kraus | ................. | B60R 13/0206 |
| | | | | | | 24/297 |
| 6,776,566 | B2 | * | 8/2004 | Kobusch | ............... | F16B 5/0283 |
| | | | | | | 411/432 |
| 7,549,199 | B2 | * | 6/2009 | Bugner | ................. | F16B 5/0628 |
| | | | | | | 24/289 |
| 7,621,085 | B2 | * | 11/2009 | Commins | ............. | E04B 1/2604 |
| | | | | | | 411/536 |
| 8,944,736 | B2 | * | 2/2015 | Figge | ................... | F16B 5/0233 |
| | | | | | | 224/322 |

(Continued)

*Primary Examiner* — Gary W Estremsky
(74) *Attorney, Agent, or Firm* — Quinn IP Law

(57) ABSTRACT

An adjustable fastening system includes a first member and a second member. The first member includes a plurality of fingers radially positioned about a central longitudinal axis, and a plurality of notches, with one of the notches disposed between an adjacent pair of the fingers. The second member is attached to the first member, and moves axially along the central longitudinal axis, relative to the first member, in response to rotational movement about the central longitudinal axis. The second member includes a plate having a protuberance extending radially outward from the central longitudinal axis. The protuberance is positioned within one of the plurality of notches, and in interlocking engagement with two of the plurality of fingers, to resist rotation of the second member relative to the first member about the central longitudinal axis.

18 Claims, 4 Drawing Sheets

(56) References Cited

U.S. PATENT DOCUMENTS

| | | | | |
|---|---|---|---|---|
| 2006/0280579 A1* | 12/2006 | Seidl | ............ | F16B 5/0233 |
| | | | | 411/546 |
| 2007/0009342 A1* | 1/2007 | Figge | ............ | F16B 5/0233 |
| | | | | 411/546 |
| 2009/0067921 A1* | 3/2009 | Ito | ............ | F16B 5/0283 |
| | | | | 403/408.1 |
| 2013/0299539 A1* | 11/2013 | Bocker | ............ | B60R 9/00 |
| | | | | 224/309 |
| 2015/0078862 A1* | 3/2015 | Zhu | ............ | F16B 7/182 |
| | | | | 411/384 |

* cited by examiner

RATCHETING PIN ADJUSTABLE FASTENING SYSTEM

INTRODUCTION

The disclosure generally relates to an adjustable fastening system.

An adjustable fastening system may be used to connect a first structure to a second structure. The adjustable fastening system enables a gap distance between the first structure and the second structure to be adjusted in order to achieve a desired alignment between the first structure and the second structure. For example, in automotive applications, an adjustable fastening system may be used to connect various components of the vehicle that require gap alignment after assembly to properly fit the components together. In one exemplary automotive embodiment, a light assembly may be attached to a body panel with an adjustable fastening system. The adjustable fastening system enables the re-positioning of the light assembly relative to the body panel in order to properly align a gap between the light assembly and the body panel.

SUMMARY

An adjustable fastening system is provided. The adjustable fastening system includes a first member and a second member. The first member defines a central longitudinal axis, and includes a plurality of fingers radially positioned about the central longitudinal axis. The first member defines a plurality of notches, with each one of the plurality of notches disposed between an adjacent pair of the plurality of fingers. The second member is attached to the first member. The second member is axially moveable along the central longitudinal axis relative to the first member in response to rotational movement of the second member relative to the first member about the central longitudinal axis. The second member includes a protuberance extending radially outward from the central longitudinal axis. The protuberance is positioned within one of the plurality of notches, and in interlocking engagement with two of the plurality of fingers, to resist rotation of the second member relative to the first member about the central longitudinal axis.

In one aspect of the adjustable fastening system, the second member includes a shaft having a lower threaded portion in threaded engagement with the first member. The shaft includes an upper connecting portion that is configured for attachment to an upper structure. In one exemplary embodiment, the upper connecting portion includes at least one rib extending annularly around a circumference of the shaft for engaging the upper structure in interlocking engagement.

In another aspect of the adjustable fastening system, the second member includes a plate that extends radially outward from the central longitudinal axis. The protuberance is disposed on a circumferential edge of the plate. The plate is disposed axially along the central longitudinal axis, between the lower threaded portion and the upper connecting portion.

In another aspect of the adjustable fastening system, the second member extends along the central longitudinal axis between a lower end and an upper end. The second member includes a tool engagement feature disposed at the upper end of the second member. The tool engagement feature may be used to rotate the second member about the central longitudinal axis relative to the first member.

In another aspect of the adjustable fastening system, each of the plurality of fingers is positioned a defined radial distance from the central longitudinal axis, and each of the plurality of fingers is spaced an equal distance from each adjacent one of the plurality of fingers.

In one embodiment of the adjustable fastening system, each of the plurality of fingers includes a cross sectional shape perpendicular to the central longitudinal axis. The cross sectional shape of each of the plurality of fingers defines one of a generally isosceles trapezoid cross sectional shape or a generally triangular cross sectional shape.

In one aspect of the adjustable fastening system, the protuberance extends radially outward to a radially outermost surface spaced from the central longitudinal axis a maximum protuberance radius. Each of the plurality of fingers has a radially innermost surface spaced from the central longitudinal axis a minimum finger radius. The maximum protuberance radius is greater than the minimum finger radius.

In one aspect of the adjustable fastening system, each respective one of the plurality of fingers is operable to flex radially outward, away from the central longitudinal axis, in response to an applied radial force. Each respective one of the plurality of fingers flexes radially outward in response to the applied radial force a distance sufficient to allow the protuberance to rotate past that respective one of the plurality of fingers. In another aspect of the adjustable fastening system, rotation of the second member relative to the first member generates the radial force, which is directed outward away from the central longitudinal axis, between the protuberance and a respective one of the plurality of fingers. The outward radial force flexes the respective one of the plurality of fingers radially away from the central longitudinal axis, thereby allowing the protuberance to move past the respective one of the plurality of fingers and into an adjacent one of the plurality of notches, whereby the second member is moved axially along the central longitudinal axis relative to the first member.

A vehicle is also provided. The vehicle includes an upper structure, a lower structure, and an adjustable fastening system interconnecting the upper structure and the lower structure. The adjustable fastening system includes a first member and a second member. The first member is attached to the lower structure, and defines a central longitudinal axis. The first member includes a plurality of fingers that are radially positioned about the central longitudinal axis. The first member defines a plurality of notches, with each one of the plurality of notches disposed between an adjacent pair of the plurality of fingers. The second member includes a shaft having a lower threaded portion in threaded engagement with the first member, and an upper connecting portion attached to the upper structure. The second member is axially moveable along the central longitudinal axis relative to the first member, in response to rotational movement about the central longitudinal axis. The second member includes a plate having a protuberance disposed on an outer circumferential surface of the plate. The protuberance extends radially outward from the central longitudinal axis. The protuberance is positioned within one of the plurality of notches and in interlocking engagement with two of the plurality of fingers to resist rotation of the second member relative to the first member about the central longitudinal axis.

In one aspect of the vehicle, rotation of the second member relative to the first member generates a radial force, directed outward away from the central longitudinal axis, between the protuberance and a respective one of the plurality of fingers. The outward radial force flexes the respective one of the plurality of fingers radially away from the central longitudinal axis, thereby allowing the protuberance to move past the respective one of the plurality of fingers and into an adjacent one of the plurality of notches. As such, the second member is moved axially along the central longitudinal axis relative to the first member to adjust a distance between the upper structure and the lower structure.

In one embodiment of the vehicle, the lower structure is a lamp assembly, and the upper structure is a body panel, with the adjustable fastening system interconnecting the lamp assembly and the body panel.

In one aspect of the vehicle, the second member extends along the central longitudinal axis between a lower end and an upper end. The second member includes a tool engagement feature disposed at the upper end of the second member, adjacent the upper connection portion. The tool engagement feature may be used to rotate the second member relative to the first member.

In one aspect of the vehicle, each of the plurality of fingers is positioned a defined radial distance from the central longitudinal axis, and each of the plurality of fingers is spaced an equal distance from each adjacent one of the plurality of fingers.

In another aspect of the vehicle, the protuberance extends radially outward from the central longitudinal axis to a radially outermost surface, which is spaced a maximum protuberance radius from the central longitudinal axis. Each of the plurality of fingers has a radially innermost surface that is spaced from the central longitudinal axis a minimum finger radius. The maximum protuberance radius is greater than the minimum finger radius.

In one embodiment of the vehicle, each of the plurality of fingers includes a cross sectional shape perpendicular to the central longitudinal axis that defines one of a generally isosceles trapezoid cross sectional shape, or a generally triangular cross sectional shape.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a fragmentary portion of a vehicle is generally shown at 20. The vehicle 20 may include any type and/or style of moveable platform, including but not limited to a car, truck, van, SUV, ATV, motorcycle, train, airplane, boat, etc.

Figure 1:
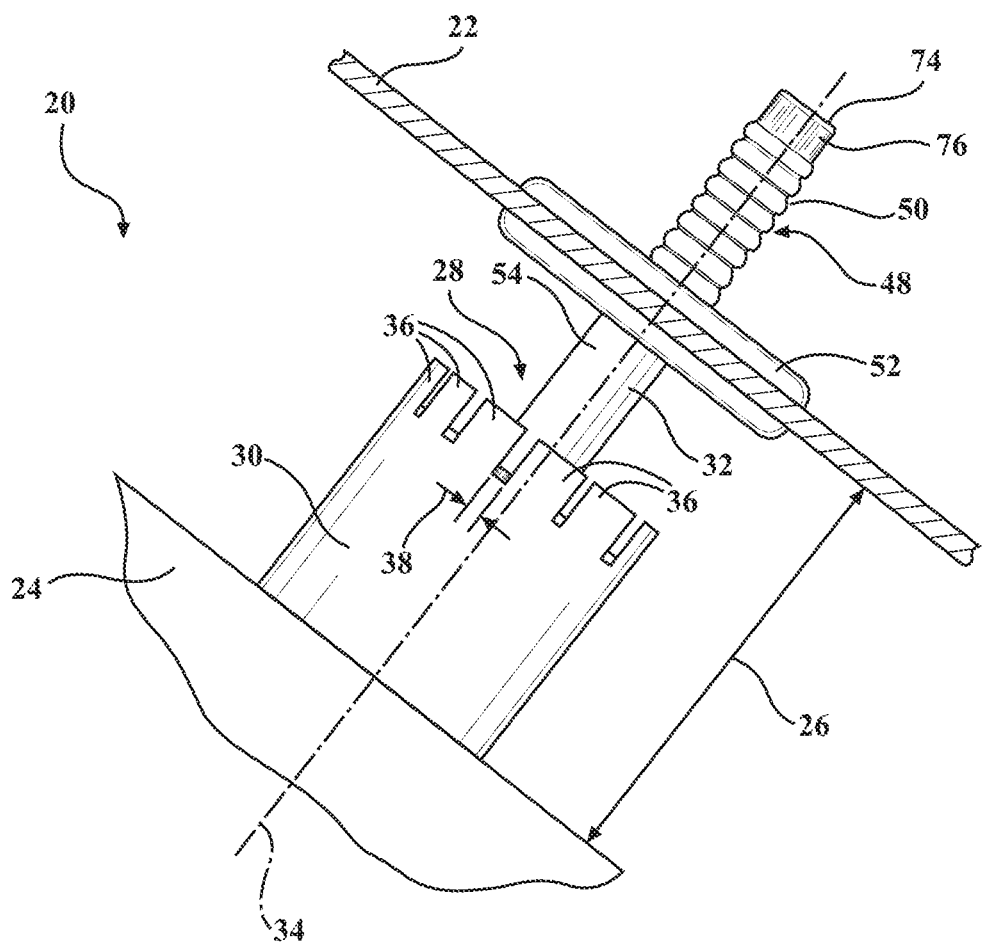
FIG. 1 is a schematic fragmentary perspective view of a vehicle showing an adjustable fastening system interconnecting a lamp assembly with a body panel.

Referring to FIG. 1, the vehicle 20 includes an upper structure 22 and a lower structure 24. The upper structure 22 and the lower structure 24 may include two components of the vehicle 20 that are attached together, and that may require positional adjustment after attachment in order to achieve a desired gap distance 26 between the two components. For example, and as shown in the drawings, the exemplary embodiment of the lower structure 24 is embodied as a light assembly, and the exemplary embodiment of the upper structure 22 is embodied as a body panel. However, it should be appreciated that the lower structure 24 and the upper structure 22 may be defined or embodied as other components of the vehicle 20 that are not shown or described herein.

Figure 2:
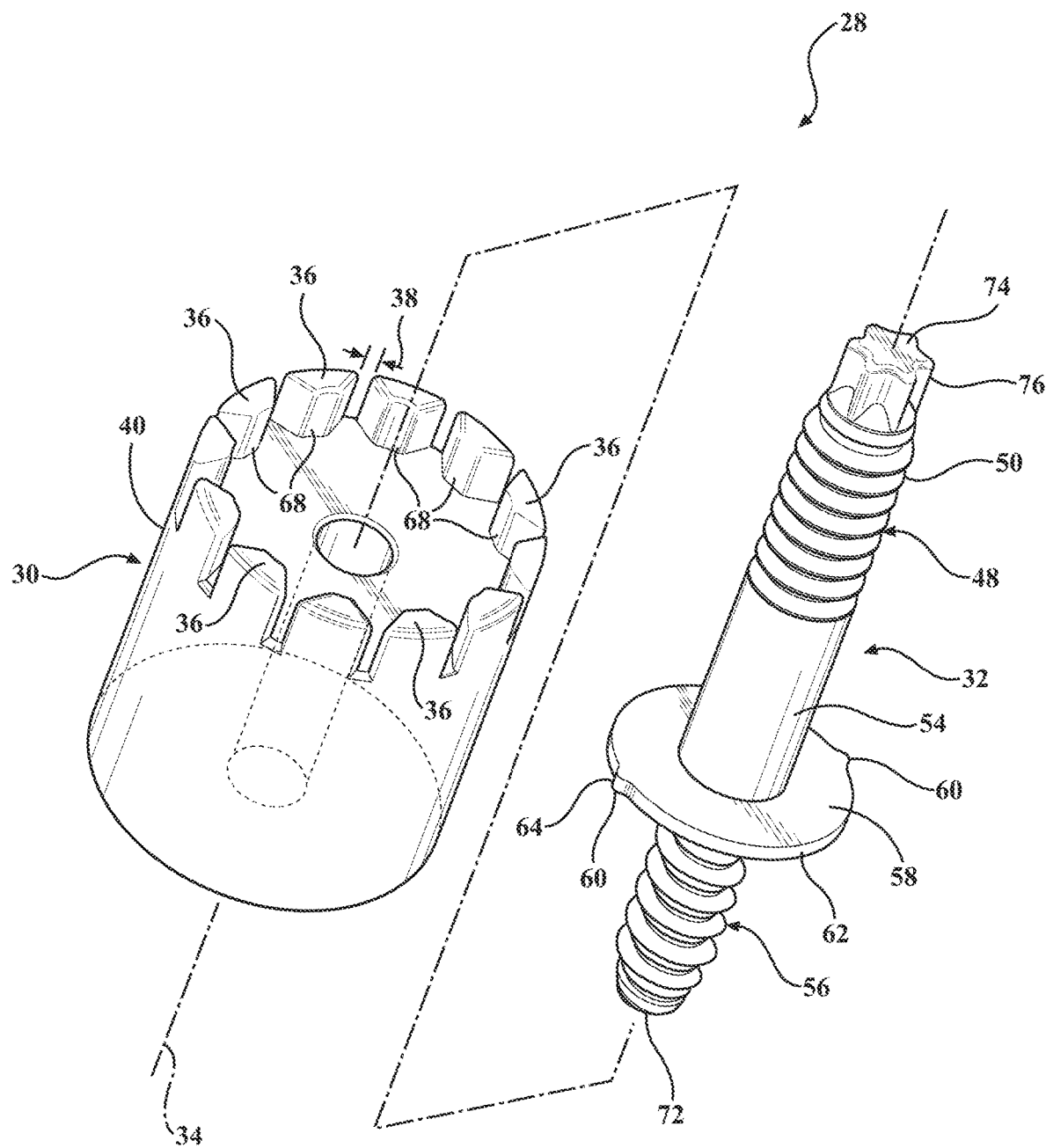
FIG. 2 is a schematic exploded perspective view of the adjustable fastening system.

Referring to FIG. 1, the vehicle 20 includes an adjustable fastening system 28 that interconnects the upper structure 22 and the lower structure 24. Referring to FIG. 2, the adjustable fastening system 28 includes a first member 30 and a second member 32. The first member 30 defines a central longitudinal axis 34. The central longitudinal axis 34 extends longitudinally along a long axis of the first member 30, and defines an approximate center of the first member 30. The first member 30 is attached to the lower structure 24. The first member 30 may be attached to the lower structure 24 in any suitable manner. For example, the first member 30 may be integrally formed or cast as part of the lower structure 24, the first member 30 may be welded to the lower structure 24, the first member 30 may be bonded to the lower structure 24 with an adhesive, or the first member 30 may be fastened to the lower structure 24 using one or more mechanical fasteners. It should be appreciated that the first member 30 may be attached to the lower structure 24 in some other manner not described herein. In one embodiment, the first member 30 is a plastic material. However, in other embodiments, the first member 30 may be formed from a non-plastic material.

Referring to FIG. 2, the first member 30 includes a plurality of fingers 36. The fingers 36 are radially positioned about the central longitudinal axis 34. Each of the fingers 36 is positioned a defined radial distance from the central longitudinal axis 34. Each of the fingers 36 is spaced an equal distance 38 from each adjacent one of the plurality of fingers 36, around a circumference 40 that is concentric with the central longitudinal axis 34.

Figure 3:
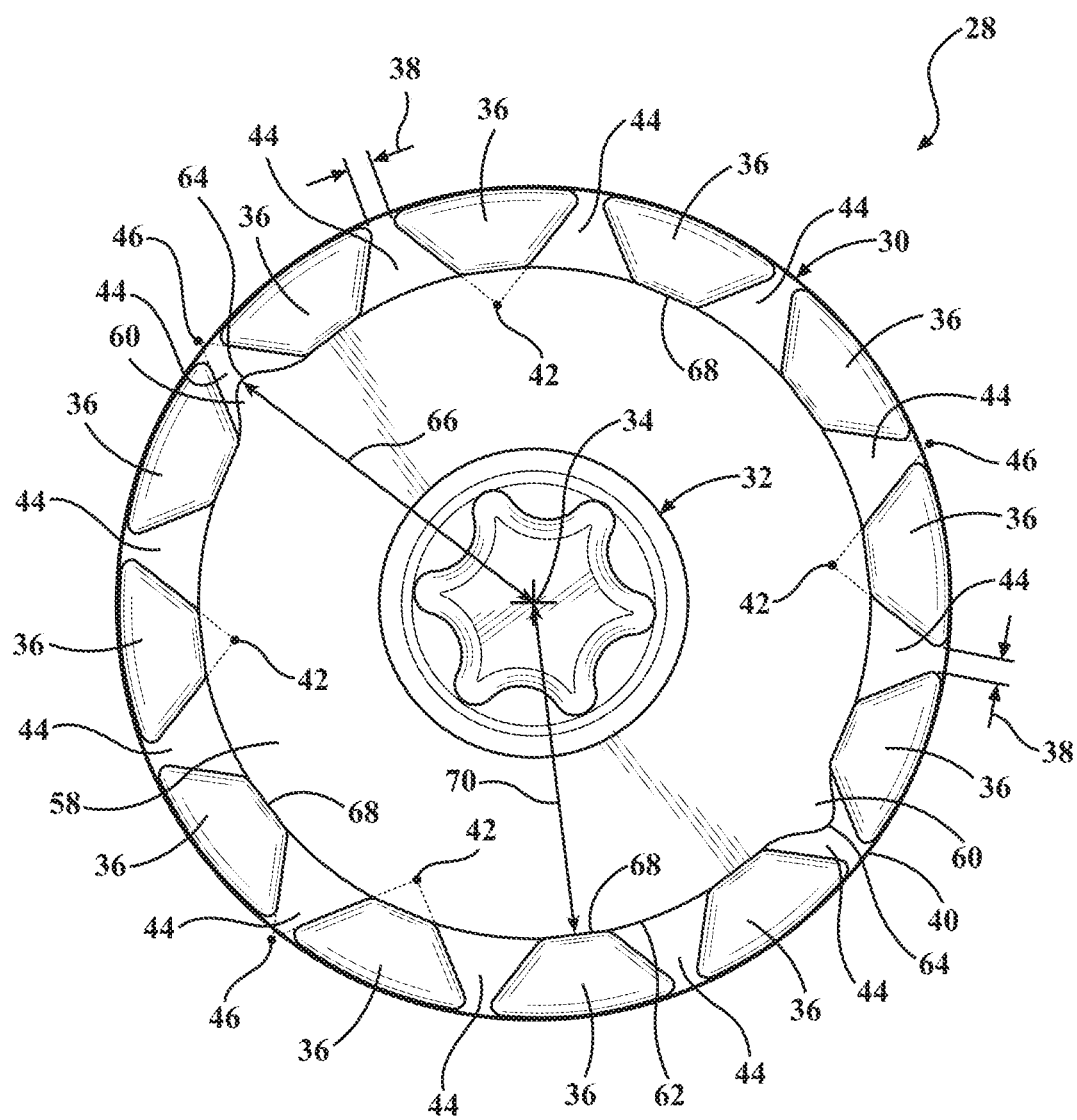
FIG. 3 is a schematic plan view of the adjustable fastening system, showing a protuberance positioned within a notch.
Figure 4:
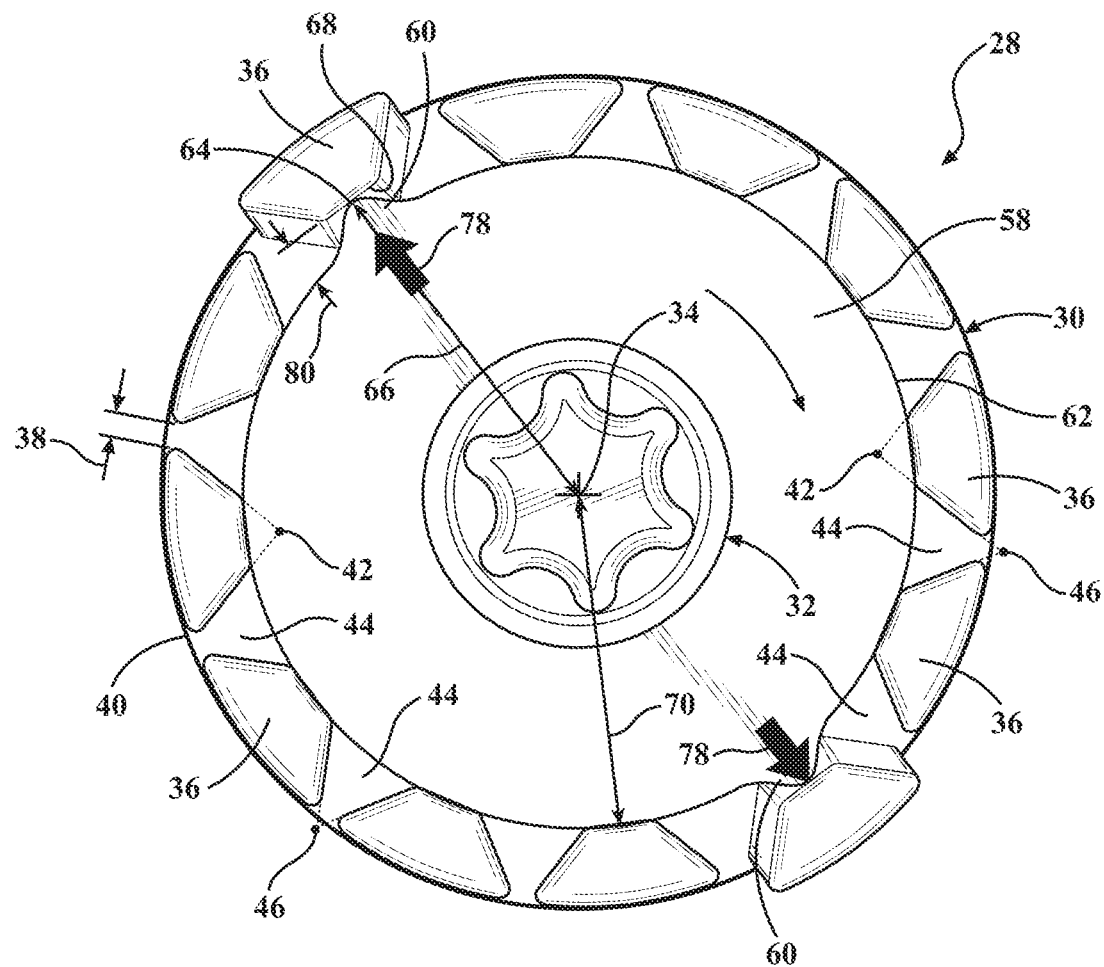
FIG. 4 is a schematic plan view of the adjustable fastening system, showing the protuberance flexing a finger radially outward in order to rotate past the finger and into an adjacent notch.

Referring to FIGS. 3 and 4, each of the fingers 36 includes a cross sectional shape perpendicular to the central longitudinal axis 34. In the exemplary embodiment shown in the drawings and described herein, the cross sectional shape of each respective one of the fingers 36 defines a generally isosceles trapezoid cross sectional shape having a virtual vertex 42 pointing toward the central longitudinal axis 34. In another possible embodiment, the cross sectional shape of each respective one of the fingers 36 may define a generally triangular cross sectional shape, having a vertex pointing toward the central longitudinal axis 34. It should be appreciated that each respective one of the fingers 36 may be formed to have a cross sectional shape that differs from the exemplary cross sectional shaped described herein.

Referring to FIG. 2, the first member 30 further defines a plurality of notches 44. Each one of the notches 44 is disposed between an adjacent pair of the fingers 36. As such, each one of the notches 44 separates and defines a gap or distance 38 between a respective pair of the fingers 36. Referring to FIGS. 3 and 4, the notches 44 may include a cross sectional shape perpendicular to the central longitudinal axis 34 forming a generally triangular cross sectional shape having a virtual vertex 46 pointing away from the central longitudinal axis 34. It should be appreciated that the notches 44 may be formed to define a cross sectional shape other than the exemplary triangular cross sectional shape described herein.

Referring to FIG. 1, the second member 32 is connected to the first member 30, and attached to the upper structure 22. The second member 32 may be attached to the upper structure 22 in any suitable manner. For example, referring to FIG. 2, the second member 32 may include an upper connecting portion 48 that is configured for attachment to the upper structure 22. In the exemplary embodiment shown in the drawings and described herein, the upper connecting portion 48 includes at least one rib 50 extending annularly around a circumference of the upper connecting portion 48. As shown in the drawings, the upper connecting portion 48 includes a plurality of ribs 50 axially spaced from each other along the central longitudinal axis 34. Referring to FIG. 1, the upper structure 22 includes a grommet 52 that is attached to the upper structure 22. The grommet 52 defines a central bore for receiving the upper connecting portion 48 of the second member 32, including the ribs 50, therethrough. The ribs 50 of the upper connecting portion 48 may engage the grommet 52 in frictional or interlocking engagement, to secure the second member 32 to the upper structure 22. It should be appreciated that the upper connecting portion 48 of the second member 32 may be configured differently than shown and described herein, and that the second member 32 may be attached to the upper structure 22 in some other manner than the exemplary embodiment described herein.

Referring to FIG. 1, the second member 32 is axially moveable along the central longitudinal axis 34 relative to the first member 30 in response to relative rotational movement about the central longitudinal axis 34 between the first member 30 and the second member 32. In the exemplary embodiment shown in the drawings and described herein, the second member 32 is rotatable about the central longitudinal axis 34 relative to the first member 30. However, it should be appreciated that in other embodiments, the first member 30 may be rotatable about the central longitudinal axis 34 relative to the second member 32.

Referring to FIG. 2, the second member 32 includes a shaft 54 that is concentric with and extends along the central longitudinal axis 34. The shaft 54 has a lower threaded portion 56, and includes the upper connecting portion 48. The lower threaded portion 56 includes a threadform that is disposed in threaded engagement with the first member 30. The threaded engagement between the lower threaded portion 56 of the second member 32 and the first member 30 enables the axial movement of the second member 32 relative to the first member 30 in response to relative rotation between the second member 32 and the first member 30. As described above, the upper connecting portion 48 is configured for attachment to the upper structure 22.

Referring to FIG. 2, the second member 32 includes a plate 58. The plate 58 is disposed axially along the central longitudinal axis 34 between the lower threaded portion 56 and the upper connecting portion 48. The plate 58 extends radially outward from the shaft 54 of the second member 32, relative to the central longitudinal axis 34. The plate 58 includes at least one protuberance 60 disposed on a circumferential edge 62 of the plate 58. In the exemplary embodiment shown in the drawings and described herein, the plate 58 includes two protuberances 60 diametrically opposed to each other across the central longitudinal axis 34. However, it should be appreciated that the plate 58 may include only a single protuberance 60, or may include more than the exemplary two protuberances 60 shown in the drawings.

Referring to FIG. 3, the protuberance 60 extends radially outward, away from the central longitudinal axis 34, to a radially outermost surface 64. The radially outermost surface 64 of the protuberance 60 is spaced a maximum protuberance radius 66 from the central longitudinal axis 34. Each of the fingers 36 has a radially innermost surface 68 that is spaced from the central longitudinal axis 34 a minimum ringer radius 70. The maximum protuberance radius 66 is greater than the minimum ringer radius 70, such that the radially outermost surface 64 of the protuberance 60 and the radially innermost surface 68 of each of the fingers 36 radially overlap relative to the central longitudinal axis 34. As shown in FIG. 3, the protuberance 60 is positioned within a respective one of the notches 44, and is disposed in interlocking engagement with two of the fingers 36 forming the respective notch 44, to resist rotation of the second member 32 relative to the first member 30 about the central longitudinal axis 34. Rotation of the second member 32 relative to the first member 30 moves the protuberance 60 between the notches 44, as well as moves the second member 32 axially along the central longitudinal axis 34 relative to the first member 30.

Referring to FIG. 2, the shaft 54 of the second member 32 extends along the central longitudinal axis 34 between a lower end 72 and an upper end 74. The lower threaded portion 56 is disposed adjacent the lower end 72 of the shaft 54, while the upper connecting portion 48 is disposed adjacent the upper end 74 of the shaft 54. The second member 32 includes a tool engagement feature 76 that is disposed at the upper end 74 of the second member 32. The tool engagement feature 76 may include any structure that is configured for engaging a tool in order to rotate the second member 32 about the central longitudinal axis 34. The exemplary embodiment of the tool engagement feature 76 shown in the drawings is embodied as a male star drive configured for engaging a female star socket. However, it should be appreciated that the tool engagement feature 76 may be configured differently than the exemplary embodiment shown. For example, the tool engagement feature 76 may include, but is not limited to, a slot for engaging a standard screwdriver, a Phillips head for engaging a Phillips screwdriver, a hex head for engaging a hex socket, etc.

Referring to FIG. 4, each respective one of the fingers 36 is operable to flex radially outward, away from the central longitudinal axis 34, in response to an applied radial force 78. Each respective one of the fingers 36 flexes radially outward in response to the applied radial force 78 a distance 80 that is sufficient to allow the protuberance 60 to rotate past that respective one of the fingers 36, and into the next adjacent notch 44. Rotation of the second member 32 relative to the first member 30 generates the radial force 78 between the protuberance 60 and the respective one of the fingers 36. The radial force 78 is directed outward away from the central longitudinal axis 34, which flexes the respective one of the fingers 36 radially away from the central longitudinal axis 34, thereby allowing the protuberance 60 to move past the respective one of the fingers 36 and into an adjacent one of the notches 44.

The lower threaded portion 56 moves the second member 32 axially along the central longitudinal axis 34 relative to the first member 30, in response to the relative rotation between the first member 30 and the second member 32. Accordingly, the tool engagement feature 76 may be used to rotate the second member 32 about the central longitudinal axis 34. As shown in FIG. 3, the interaction between the protuberance 60 and the fingers 36 secures the position of the second member 32 relative to the first member 30. However, referring to FIG. 4, upon sufficient torque being applied to the second member 32, the protuberance 60 forces a respective one of the fingers 36 to flex radially outward and away from the central longitudinal axis 34 so that the second member 32 may rotate about the central longitudinal axis 34 and the protuberance 60 may move into the adjacent notch 44 and secure the second member 32 relative to the first member 30 in a new position. By so doing, because the second member 32 moves axially along the central longitudinal axis 34 in response to rotation about the central longitudinal axis 34, the gap distance 26 between the lower structure 24 and the upper structure 22 is adjusted to properly position the lower structure 24 and the upper structure 22 relative to each other.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An adjustable fastening system comprising:
   a first member defining a central longitudinal axis, and including a plurality of fingers radially positioned about the central longitudinal axis;
   wherein the first member defines a plurality of notches, with each one of the plurality of notches disposed between an adjacent pair of the plurality of fingers;
   a second member attached to the first member and axially moveable along the central longitudinal axis relative to the first member in response to rotational movement about the central longitudinal axis; and
   wherein:
     the second member includes a protuberance extending radially outward from the central longitudinal axis, with the protuberance positioned within one of the plurality of notches and in interlocking engagement with two of the plurality of fingers to resist rotation of the second member relative to the first member about the central longitudinal axis;
     the second member includes a plate extending radially outward from the central longitudinal axis, with the protuberance disposed on a circumferential edge of the plate; and
     the second member includes a shaft having a lower threaded portion engaged with the first member, and an upper connecting portion, with the plate disposed axially along the central longitudinal axis between the lower threaded portion and the upper connecting portion.

2. The adjustable fastening system set forth in claim 1, wherein the second member includes a shaft having a lower threaded portion in threaded engagement with the first member.

3. The adjustable fastening system set forth in claim 2, wherein the shaft includes an upper connecting portion configured for attachment to an upper structure.

4. The adjustable fastening system set forth in claim 3, wherein the upper connecting portion includes at least one rib extending annularly around a circumference of the shaft.

5. The adjustable fastening system set forth in claim 1, wherein the second member extends along the central longitudinal axis between a lower end and an upper end, and includes a tool engagement feature disposed at the upper end of the second member.

6. The adjustable fastening system set forth in claim 1, wherein each of the plurality of fingers is positioned a defined radial distance from the central longitudinal axis, and wherein each of the plurality of fingers is spaced an equal distance from each adjacent one of the plurality of fingers.

7. The adjustable fastening system set forth in claim 1, wherein each of the plurality of fingers includes a cross sectional shape perpendicular to the central longitudinal axis defining one of a generally isosceles trapezoid cross sectional shape or a generally triangular cross sectional shape.

8. The adjustable fastening system set forth in claim 1, wherein the protuberance extends radially outward from the central longitudinal axis a maximum protuberance radius.

9. The adjustable fastening system set forth in claim 8, wherein each of the plurality of fingers has a radially innermost surface spaced from the central longitudinal axis a minimum finger radius, with the maximum protuberance radius being greater than the minimum finger radius.

10. The adjustable fastening system set forth in claim 1, wherein each respective one of the plurality of fingers is operable to flex radially outward, away from the central longitudinal axis, in response to an applied radial force, and wherein each respective one of the plurality of fingers flexes radially outward in response to the applied radial force a distance sufficient to allow the protuberance to rotate past that respective one of the plurality of fingers.

11. The adjustable fastening system set forth in claim 1, wherein rotation of the second member relative to the first member generates a radial force, directed outward away from the central longitudinal axis, between the protuberance and a respective one of the plurality of fingers, which flexes the respective one of the plurality of fingers radially away from the central longitudinal axis, thereby allowing the protuberance to move past the respective one of the plurality of fingers and into an adjacent one of the plurality of notches, whereby the second member is moved axially along the central longitudinal axis relative to the first member.

12. A vehicle comprising:
   an upper structure;
   a lower structure;
   an adjustable fastening system interconnecting the upper structure and the lower structure, the adjustable fastening system including:
     a first member attached to the lower structure, defining a central longitudinal axis, and including a plurality of fingers radially positioned about the central longitudinal axis;
     wherein the first member defines a plurality of notches, with each one of the plurality of notches disposed between an adjacent pair of the plurality of fingers;
     a second member including a shaft having a lower threaded portion in threaded engagement with the first member, and an upper connecting portion attached to the upper structure;
     wherein the second member is axially moveable along the central longitudinal axis relative to the first member in response to rotational movement about the central longitudinal axis; and wherein the second member includes a plate having a protuberance disposed on an outer circumferential surface of the plate, and extending radially outward from the central longitudinal axis, with the protuberance positioned within one of the plurality of notches and in interlocking engagement with two of the plurality of fingers to resist rotation of the second member relative to the first member about the central longitudinal axis.

13. The vehicle set forth in claim 12, wherein rotation of the second member relative to the first member generates a radial force, directed outward away from the central longitudinal axis, between the protuberance and a respective one of the plurality of fingers, which flexes the respective one of the plurality of fingers radially away from the central longitudinal axis, thereby allowing the protuberance to move past the respective one of the plurality of fingers and into an adjacent one of the plurality of notches, whereby the second member is moved axially along the central longitudinal axis relative to the first member to adjust a distance between the upper structure and the lower structure.

14. The vehicle set forth in claim 12, wherein the second member extends along the central longitudinal axis between a lower end and an upper end, and includes a tool engagement feature disposed at the upper end of the second member, adjacent the upper connection portion.

15. The vehicle set forth in claim 12, wherein each of the plurality of fingers is positioned a defined radial distance from the central longitudinal axis, and wherein each of the plurality of fingers is spaced an equal distance from each adjacent one of the plurality of fingers.

16. The vehicle set forth in claim 12, wherein each of the plurality of fingers includes a cross sectional shape perpendicular to the central longitudinal axis defining one of a generally isosceles trapezoid cross sectional shape or a generally triangular cross sectional shape.

17. The vehicle set forth in claim 12, wherein:
the protuberance extends radially outward from the central longitudinal axis to a radially outermost surface spaced a maximum protuberance radius from the central longitudinal axis;
each of the plurality of fingers has a radially innermost surface spaced from the central longitudinal axis a minimum finger radius; and
wherein the maximum protuberance radius is greater than the minimum finger radius.

18. The vehicle set forth in claim 12, wherein the lower structure is a lamp assembly, and the upper structure is a body panel.

\* \* \* \* \*